(12) United States Patent
Barr et al.

(10) Patent No.: US 6,626,482 B2
(45) Date of Patent: Sep. 30, 2003

(54) VEHICLE DOOR ASSEMBLY

(75) Inventors: Geoffrey Barr, Troy, MI (US); Gordon L. Cook, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/024,439

(22) Filed: Dec. 18, 2001

(65) Prior Publication Data

US 2003/0111865 A1 Jun. 19, 2003

(51) Int. Cl.[7] ................................................. B60J 5/04
(52) U.S. Cl. ................................ 296/146.7; 296/146.5
(58) Field of Search ........................... 296/146.5, 146.7, 296/146.1; 49/502, 503

(56) References Cited

U.S. PATENT DOCUMENTS

| | | | | |
|---|---|---|---|---|
| 4,831,710 A | * | 5/1989 | Katoh et al. .............. 296/146.5 |
| 5,050,350 A | * | 9/1991 | Bertolini et al. .............. 49/502 |
| 5,535,553 A | * | 7/1996 | Staser et al. ................... 49/502 |
| 5,584,144 A | * | 12/1996 | Hisano ......................... 49/502 |
| 5,884,434 A | * | 3/1999 | Dedrich et al. ................. 49/503 |
| 5,896,705 A | * | 4/1999 | Salmonowicz et al. ........ 49/502 |
| 5,947,547 A | * | 9/1999 | Deeks et al. ............. 296/146.7 |
| 6,176,542 B1 | * | 1/2001 | Gooding et al. ......... 296/146.5 |
| 6,196,607 B1 | * | 3/2001 | Gulisano ................ 296/146.7 |

* cited by examiner

Primary Examiner—D. Glenn Dayoan
Assistant Examiner—Jason Morrow
(74) Attorney, Agent, or Firm—Scott A. McBain

(57) ABSTRACT

A vehicle door assembly that includes an outer panel and an inner panel which define a space in which hardware items are located. A trim panel including an inner door handle assembly is positioned on an inside of the inner panel. Connecting rods are positioned within the space and have a first end that is connected to a latch. The second end of the rod is connected to the inner door handle assembly. The rod is retained within a clip proximate to the second end of the rod. The clip allows for longitudinal movement of the rod while retaining the rod in the other two dimensions. This arrangement facilitates attachment of the inner door handle assembly and rod when the inner panel is installed.

22 Claims, 2 Drawing Sheets

VEHICLE DOOR ASSEMBLY

FIELD OF THE INVENTION

The subject invention relates to a vehicle door assembly, and more particularly to a vehicle door assembly wherein the connection rods for a latch assembly are preassembled and retained within the door assembly such that the inner door handle is aligned with the rods to facilitate attachment of the inner door handle and the rod.

BACKGROUND OF THE INVENTION

It is known in the art to produce a motor vehicle door having an inner panel and an outer panel that define an opening therebetween.

It is also known in the art to include within the space between the inner and outer panel door hardware items such as reinforcements, window regulators, door latches, inside door handles and radio speakers.

Various modules that include subassemblies for the door hardware outlined above have been utilized in the art to increase the efficiency of the manufacturing process. Such modules can be pretested for quality to assure that the components are functioning properly before installation into the vehicle door.

Connecting rods may be utilized to connect a latch assembly with an inner door handle to facilitate actuation of the lock and latch assemblies. It is known in the art that flexible connection cables may be utilized in lieu of connecting rods to attach the latch mechanism with an inner door handle. However, flexible cable connections significantly increase the cost associated with connecting a latch mechanism and an inner door handle.

During the manufacturing process of a vehicle door assembly, problems arise when attaching the latch mechanisms to the inner door handle, including bent connecting rods, as well as significant assembly time associated with connecting the items on an assembly line. Therefore, there is a need in the art for a vehicle door assembly that includes connecting rods that are positioned in the space defined by the outer and inner panels such that the rod assemblies are not bent during installation into a door assembly and the rods are correctly positioned to facilitate easy installation.

SUMMARY OF THE INVENTION

A vehicle door assembly including an outer panel and an inner panel which define a space. There is also included a trim panel that has an inner door handle assembly integrally formed therewith. The trim panel is positioned on an inside of the inner panel in the assembly process. There is also included at least one rod positioned within the space and having a first end connected to a latch and a second end connected to the inner door handle assembly. The rod is retained within a clip proximate to the second end of the rod. The clip allows for longitudinal movement of the rod while retaining the rod in two dimensions other than the longitudinal dimension. When the trim panel is positioned in relation to the inner panel during the assembly process, the inner door handle assembly is aligned with the second end of the rod to facilitate attachment of the inner door handle assembly and rod.

In an alternative embodiment, the latch and rod assemblies may be preassembled in a door module, that may be pretested before insertion into the door assembly.

The vehicle door assembly of the present invention has the advantage of providing a latch and connecting rod mechanism that is positioned such that attachment to an inner door handle does not require significant manipulation by an operator in an assembly line.

The vehicle door assembly of the present invention has the further advantage of providing a latch and connecting rod mechanism that facilitates engagement with an inner door handle without the bending of the connection rods.

The vehicle door assembly of the present invention has the further advantage of providing a cost-effective rod mechanism that does not require expensive flexible cable connections.

BRIEF DESCRIPTION OF THE DRAWINGS

These and other features and advantages of the present invention will become more readily appreciated when considered in connection with the following detailed description and drawings, wherein.

DETAILED DESCRIPTION OF THE INVENTION

Figure 1:
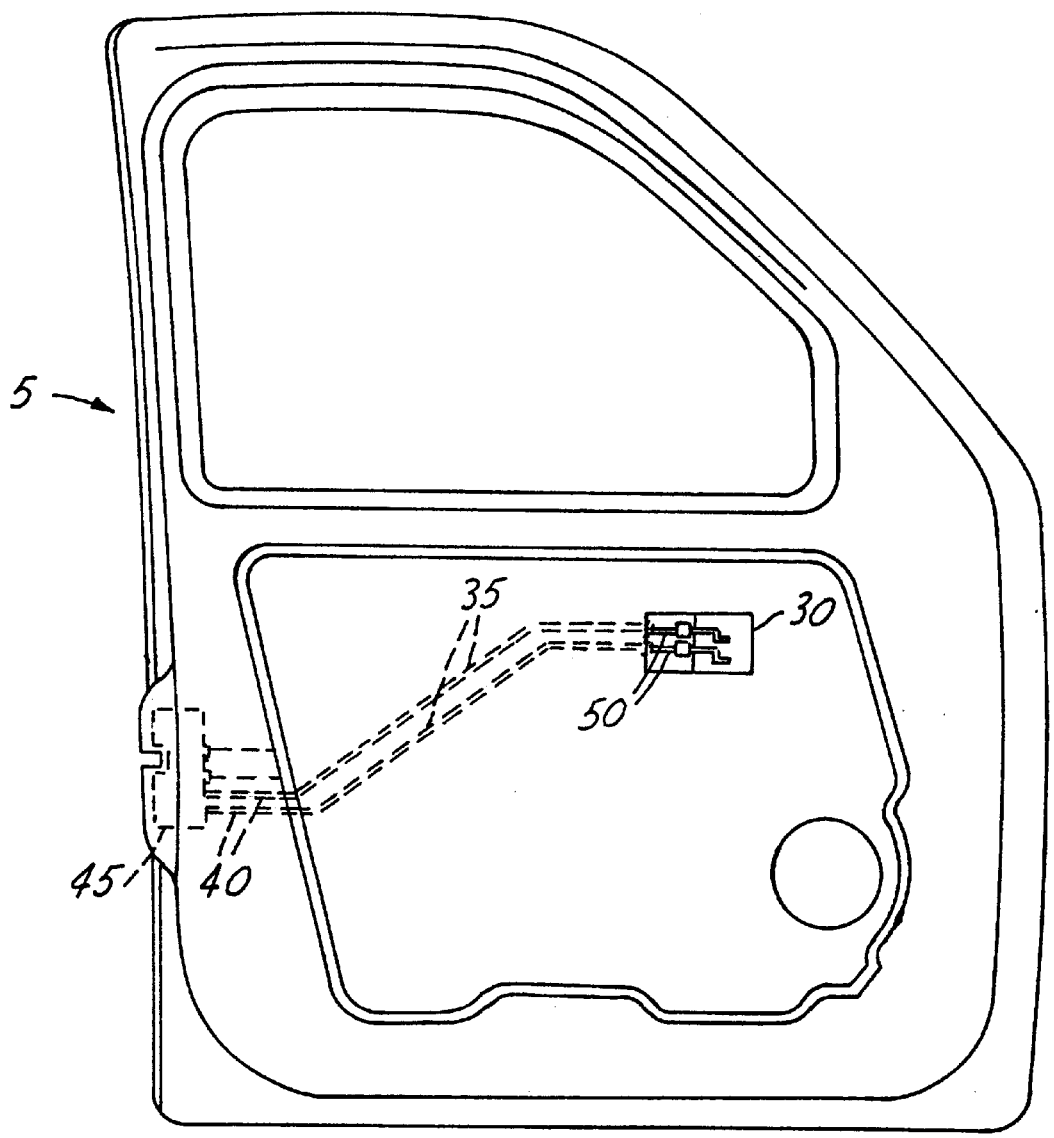
FIG. 1 is a side view detailing the vehicle door assembly including the latch connecting rod.
Figure 2:
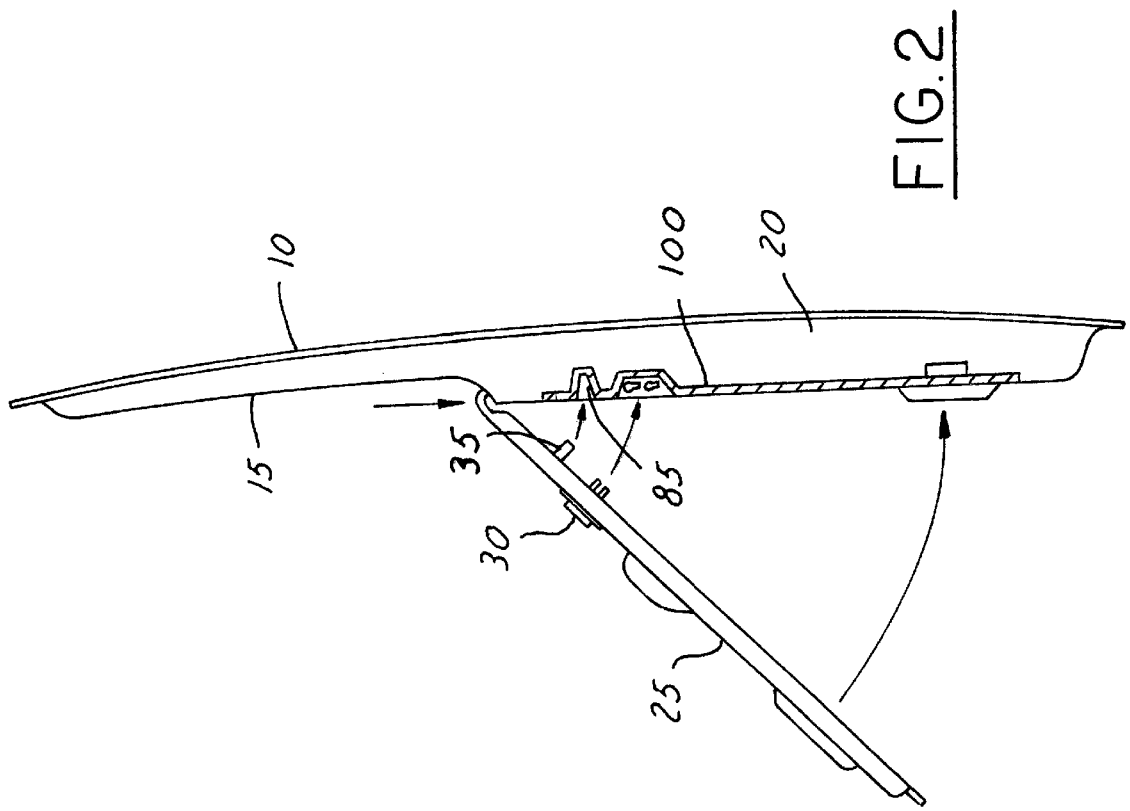
FIG. 2 is a sectional view detailing the door assembly of the present invention, including the inner and outer door panels as well as the trim and door module.

With reference to FIGS. 1 and 2, it can be seen that the vehicle door assembly includes an outer panel 10 and an inner panel 15. There is also included a space 20 defined by the outer panel 10 and inner panel 15. A trim panel 25 that includes an inner door handle assembly 30 that is integrally formed therewith is positioned on the inside of the inner panel 15. There is included at least one rod 35 that is positioned within the space 20. The rod has a first end 40 connected to a latch 45 and a second end 50 connected to the inner door handle assembly 30.

In a first embodiment of the present invention, the door assembly includes two rods 35 positioned within the space 20 having both of their first ends 40 connected to a latch 45. Both of the second ends 50 of the two rods 35 are connected to the inner door handle assembly 30. In the first embodiment, the rods 35 are retained within a clip 55 proximate to the second ends 50 of the rods 35. The clip 55 allows for longitudinal movement of the rods 35 while retaining the rods 35 in the other two dimensions other than the longitudinal dimension. In this manner, when the trim panel 25 is positioned in relation to the inner panel 15, the inner door handle assembly 30 is aligned with the second ends 50 of the rods 35 to facilitate attachment of the inner door handle assembly 30 and the rods 35.

Figure 3:
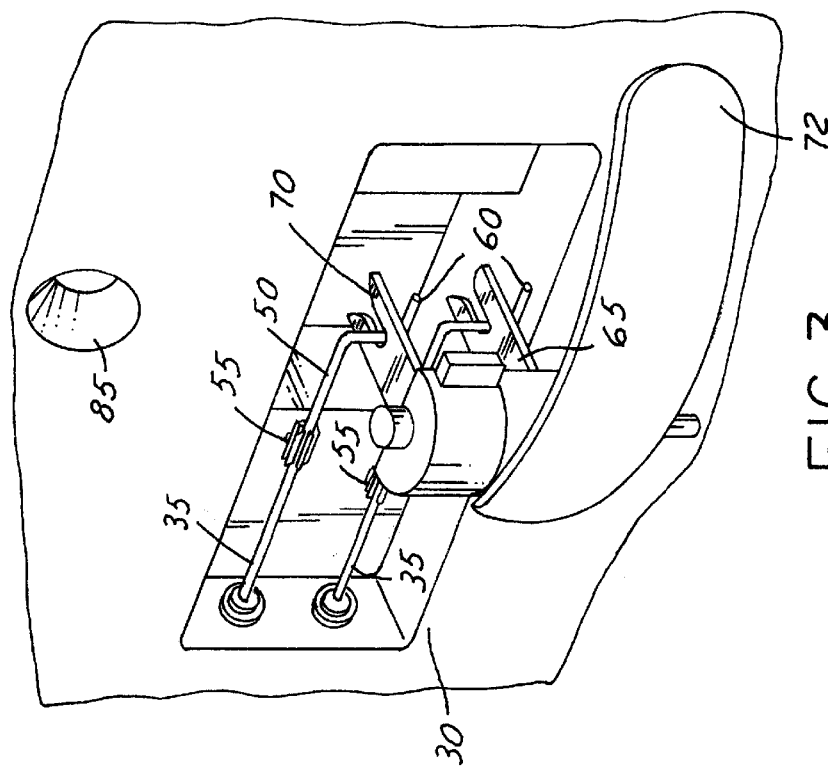
FIG. 3 is a perspective view detailing the handle and escutcheon integral with the trim panel, as well as the retaining clip of the present invention.

With reference to FIG. 3, it can be seen that the second end 50 of the first and second rods 35 includes a Z or U-shaped section 60 for intersecting with the inner door handle assembly 30.

Again with reference to FIG. 3, the inner door handle assembly 30 includes a door handle lever 65 and a door lock lever 70. Both of the levers 65, 70 are planar fork-shaped members extending from the door handle 72. The fork-shaped members include a slot formed centrally in which the Z or U-shaped section 60 of the first and second rods are inserted during the assembly process. The first rod 35 is connected at the first end 40 with the latch 45 and at the second end 50 with the door handle lever 65. The second rod 35 is connected at the first end 40 with the latch 45 and at the second end 50 with a door lock lever 70.

With reference to FIGS. 1 and 2, the trim panel 25 includes a location feature 75 that mates with the inner panel 15 to position the trim panel 25 in relation to the inner panel 15 and facilitate engagement of the rods 35 with the inner door handle assembly 30. The location feature 75 is generally a member 80 that extends from the trim panel in a direction towards the inner panel 15 when the trim panel 25 is positioned in relation to the inner panel 15 for assembly. There is a corresponding opening 85 within the inner panel 15 to accept the member 80 that extends from the trim panel 25 when the trim panel 25 is positioned in relation to the inner panel 15 for assembly. Preferably, the opening 85 is frusto-conical in shape to facilitate mating of the member 80 within the opening 85.

In a second embodiment of the present invention, the two rods 35 are part of a preassembled module 100 that allows for pretesting of the assembly prior to insertion into the space 20 during the manufacturing process. Again, the door assembly 5 preferably includes two rods 35. The preassembled module 100 is placed within the space 20 defined by the outer panel 10 and inner panel 15. As with the previously described first embodiment, the second embodiment includes Z or U-shaped sections 60 formed on the second end 50 of the first and second rods 35 that intersect with the inner door handle assembly 30. Similarly, the first rod is connected at a first end 40 with the latch 45 and at the second end 50 with a door handle lever 65. The second rod 35 is connected at the first end 40 with the latch 45 and at the second end 50 with a door lock lever 70.

As with the first embodiment, the second embodiment includes a trim panel 25 that includes a location feature 75 that mates with the module 100 to position the trim panel 25 in relation to the module 100 and facilitate engagement of the rod 35 with the inner door handle assembly 30. The module includes an opening 85 similar to that described in the first embodiment, and is preferably frusto-conical in shape.

As with the previously described first embodiment, the rods 35 are retained within a clip 55 proximate to the second end 50 of the rod 35. In the second embodiment, the clip 55 is preferably integrally formed with the module 100. The clip 55 allows for longitudinal movement of the rods 35 to facilitate engagement of the Z or U-shaped sections 60 with the inner door handle assembly 30.

During the assembly process, the rods 35 are inserted into the opening 20 defined by the outer panel 10 and inner panel 15. Dependent on the embodiment utilized, the rods 35 are either inserted as a part of the latch assembly 45, or as a portion of a door module 100. Preferably, the second embodiment incorporating the rods 35 into a module 100 is utilized by the present invention.

Regardless of the embodiment utilized, the first end 40 of the rods 35 are connected to the latch 45 and the second ends are retained in clips 55 proximate the second end 50 of the rods 35.

The trim panel 25 is then positioned on an inside of the inner panel 15 such that the location feature 75 intersects with the opening 85 formed either in the inner panel 25 or the module 100 dependent on the embodiment utilized. In this manner, the trim panel 25 including an integrally formed inner door handle assembly 30 is positioned such that the Z or U-shaped section 60 of the rods 35 may be moved longitudinally to intersect with the door handle lever 65 and door lock lever 70. In this manner, the assembly time associated with such an operation is dramatically reduced, and damage to the rods 35 is eliminated.

The present invention has been described in accordance with the relevant legal standards, thus the foregoing description is exemplary rather than limiting in nature. Variations and modifications to the disclosed embodiments may become apparent to those skilled in the art. Accordingly, the scope of legal protection afforded this invention can be determined by studying the following claims.

We claim:

1. A vehicle door assembly comprising:

an outer panel;

an inner panel;

a space defined by the outer and inner panels;

a trim panel including an inner door handle assembly integrally formed therewith, the trim panel positioned on an inside of the inner panel;

at least one rod positioned within the space and having a first end connected to a latch and a second end connected to the inner door handle assembly; the rod being being attached to the inner panel and retained within a clip proximate to the second end of the rod, the clip being attached to the inner panel and allowing for longitudinal movement of the rod while retaining the rod in two dimensions other than the longitudinal dimension such that when the trim panel is positioned in relation to the inner panel, the inner door handle assembly is aligned with the second end of the rod to facilitate attachment of the inner door handle assembly and rod.

2. The vehicle door assembly of claim 1 wherein the door assembly includes 2 rods.

3. The vehicle door assembly of claim 2 wherein the second end of the first and second rods includes a Z or U-shaped section to intersect with the inner door handle assembly.

4. The vehicle door assembly of claim 2 wherein the first rod is connected at the first end with the latch and at the second end with a door handle lever.

5. The vehicle door assembly of claim 2 wherein the second rod is connected at the first end with the latch and at the second end with a door lock lever.

6. The vehicle door assembly of claim 1 wherein the trim panel further includes allocation feature that mates with the inner panel to position the trim panel in relation to the door panel and facilitate engagement of the at least one rod with the inner door handle assembly.

7. The vehicle door assembly of claim 6 wherein the location feature comprises a member extending from the trim panel in a direction towards the inner panel when the trim panel is positioned in relation to the inner panel for assembly.

8. The vehicle door assembly of claim 7 wherein the inner panel further includes an opening to accept the member extending from the trim panel when the trim panel is positioned in relation to the inner panel for assembly.

9. The vehicle door assembly of claim 8 wherein the opening is frusto-conical in shape to facilitate mating with the member.

10. The vehicle door assembly of claim 6 wherein the trim panel further includes an opening to accept a member extending from the inner panel when the trim panel is positioned in relation to the inner panel for assembly.

11. The vehicle door assembly of claim 1 wherein the at least one rod is a part of a pre-assembled module for allowing pre-testing of the module and wherein the module is positioned within the space defined by the outer and inner panels when manufacturing the door assembly.

12. The vehicle door assembly of claim 11 wherein the door assembly includes 2 rods.

13. The vehicle door assembly of claim 12 wherein the second end of the first and second rods includes a Z or U-shaped section to intersect with the inner door handle assembly.

14. The vehicle door assembly of claim 12 wherein the first rod is connected at the first end with the latch and at the second end with a door handle lever.

15. The vehicle door assembly of claim 12 wherein the second rod is connected at the first end with the latch and at the second end with a door lock lever.

16. The vehicle door assembly of claim 11 wherein the trim panel further includes a location feature that mates with the module to position the trim panel in relation to the module and facilitate engagement of the rod with the inner door handle assembly.

17. The vehicle door assembly of claim 16 wherein the location feature comprises a member extending from the trim panel in a direction towards the module when the trim panel is positioned in relation to the module for assembly.

18. The vehicle door assembly of claim 17 wherein the module further includes an opening to accept the member extending from the trim panel when the trim panel is positioned in relation to the module for assembly.

19. The vehicle door assembly of claim 17 wherein the opening is frusto-conical in shape to facilitate mating with the member.

20. The vehicle door assembly of claim 16 wherein the trim panel further includes an opening to accept a member extending from the module when the trim panel is positioned in relation to the module for assembly.

21. The vehicle door assembly of claim 11 wherein the clip is integral with the module.

22. A vehicle door assembly comprising:

an outer panel;

an inner panel;

a space defined by the outer and inner panels;

a trim panel including an inner door handle assembly integrally formed therewith, the trim panel positioned on an inside of the inner panel;

a door module positioned within the space, the module including at least one rod having a first end connected to a latch and a second end connected to the inner door handle assembly; the rod being retained within a clip proximate to the second end of the rod, the clip allowing for longitudinal movement of the rod while retaining the rod in two dimensions other than the longitudinal dimension such that when the trim panel is positioned in relation to the inner panel, the inner door handle assembly is aligned with the second end of the rod to facilitate attachment of the inner door handle assembly and rod.

\* \* \* \* \*